(12) United States Patent
Jha et al.

(10) Patent No.: US 10,482,887 B1
(45) Date of Patent: Nov. 19, 2019

(54) MACHINE LEARNING MODEL ASSISTED ENHANCEMENT OF AUDIO AND/OR VISUAL COMMUNICATIONS

(71) Applicant: Amazon Technologies, Inc., Seattle, WA (US)

(72) Inventors: Madhav Jha, San Francisco, CA (US); Edo Liberty, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/925,451

(22) Filed: Mar. 19, 2018

(51) Int. Cl.
*G10L 19/00* (2013.01)
*G06N 3/04* (2006.01)
*H04L 12/26* (2006.01)
*G06N 20/00* (2019.01)

(52) U.S. Cl.
CPC ............ *G10L 19/0018* (2013.01); *G06N 3/04* (2013.01); *G06N 20/00* (2019.01); *H04L 43/08* (2013.01)

(58) Field of Classification Search
CPC .................................................. G10L 19/0018
See application file for complete search history.

(56) References Cited

U.S. PATENT DOCUMENTS

2005/0182623 A1* 8/2005 Shalem ................... G10L 19/20
704/229
2006/0120350 A1* 6/2006 Olds ................. H04L 29/06027
370/352

* cited by examiner

*Primary Examiner* — Yu-Hsi D Sun
(74) *Attorney, Agent, or Firm* — Nicholson De Vos Webster & Elliott, LLP

(57) ABSTRACT

Techniques for using machine learning models to approximate a user in a communication are described. For example, a method of initiating a communication link with an edge device to exchange audio data; receiving a compressed audio data from the edge device; re-encoding the received compressed audio data using a re-encoding machine learning model to approximate a voice; and outputting the approximated voice is detailed.

20 Claims, 15 Drawing Sheets

MACHINE LEARNING MODEL ASSISTED ENHANCEMENT OF AUDIO AND/OR VISUAL COMMUNICATIONS

BACKGROUND

Many communications are occurring over packet-switch networks including voice and/or video communications instead of traditional circuit-switched networks. These communications typically include signaling, channel setup, voice and/or video content encoding/decoding. Many codecs exist for the encoding/decoding that may be used to optimize the stream of packets making up a communication.

BRIEF DESCRIPTION OF DRAWINGS

Various embodiments in accordance with the present disclosure will be described with reference to the drawings, in which.

DETAILED DESCRIPTION

Various embodiments of methods, apparatus, systems, and non-transitory computer-readable storage media for machine learning model assisted enhancement of audio and/or visual communications are described.

Some codecs allow for different characteristics for the content of a packet-based audio and/or video communication depending upon available bandwidth. For example, some codecs allow for different compression levels (such as the sampling rate, frequencies utilized, image quality, etc.) which impact the size and quality of the content. However, not all connections used for packet-based audio and/or video communications are equal. There are times when at least one end of the conversation has a connection that is too poor to reliably carry on a communication of audio and/or video.

Detailed below are exemplary embodiments of utilizing at least one machine learning (ML) model in compression and/or re-encoding of audio and/or video content to allow for more reliable communications, especially with poorer connections. At least some of the content of the communication is compressed and then decompressed/re-encoded by the receiver using the at least one machine learning (ML) model tailored to the sending user. For example, in some implementations, during a communication a sending client encodes audio into a compressed format (such as raw-text, intermediate ML format, etc.) using a ML model, and sends the compressed format to a receiving client to be re-encoded using a ML model. In some embodiments, the intermediate ML format includes compressed audio and/or video and metadata about the compressed audio and/or video.

Figure 1:
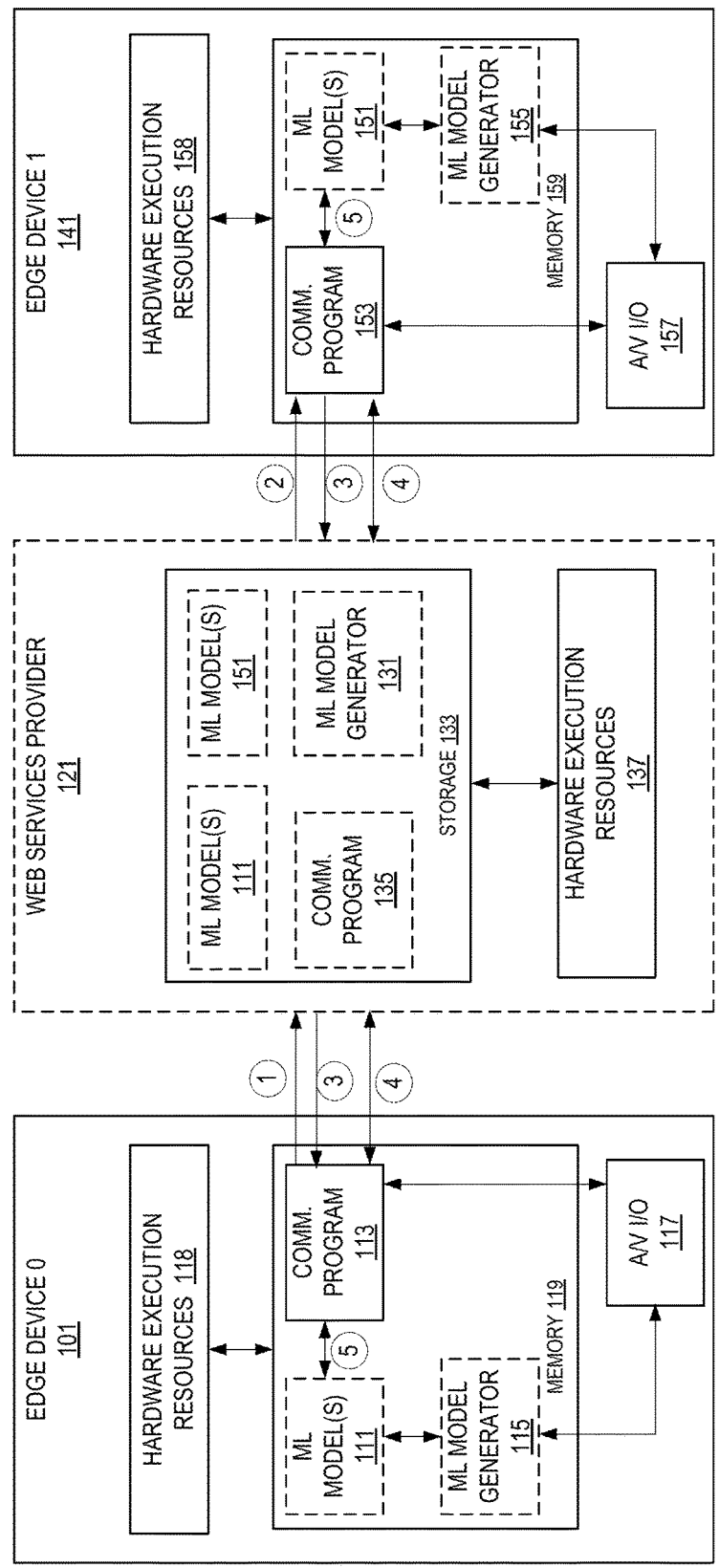
FIG. 1 illustrates examples of embodiments that support using at least one ML model for an audio and/or visual communication.

FIG. 1 illustrates examples of embodiments that support using at least one ML model for an audio and/or visual communication. A plurality of edge devices 101, 141 (note that more edge devices may be used than the two illustrated) are used to by a first and a second user to communicate with each other. For example, a first user (user 0) of edge device 0 101 communicates with a second user (user 1) of edge device 1 141. The edge devices 101, 141 connect over a packet-switched network communication link, and, depending upon the embodiment, the edge devices 101, 141 connect over a peer-to-peer communication link, or use a third party to form a communication link. In this illustration, a web services provider server (s) 121 is this third party, but other non-edge devices may be used.

Each edge device 101, 141 includes hardware execution resources 118, 158 to execute software stored in, or accessible to, each respective edge device 101, 141 and memory 119, 159 to store a communication program 113, 153 to be used in the communication between users of the edge devices 101, 141. Exemplary communication programs 113, 153 include VOIP software, video call/conferencing software, etc.

Depending upon the embodiment, the memory 119, 159 of each edge device 101, 141 also stores at least one ML model 111, 151 to be used during the communication. For example, memory 119 may store a first type of user ML model for the user of edge device 0 101 to be used by the communication program 113 in compressing audio and/or video received from audio and/or video input/output device 117 and a second type of user ML model for the user of edge device 1 141 to be used by the communication program 113 to re-encode communication content sent from the user of edge device 1 141. Throughout the remainder of this description, the first type of user ML models are called "user compression ML models" and the second type of user ML models are called "user re-encoding ML models." Note that "user" may include a model that is not specific to a particular user as detailed below. Depending upon the implementation, user compression ML models abstract one or more personality features such as pitch, tone, pace, or pause.

As such, each of the edge devices 101, 141 stores, or has access to one or more of: 1) a user compression ML model that corresponds to the sending user of the edge device to be used in compressing audio and/or video input from an audio and/or video input/output device 117, 157 (such as a microphone, camera, etc.) to the other edge device (for example, edge device 101 may store a user compression ML model for its user); 2) a user re-encoding ML model to be used by an edge device that receives compressed audio and/or video from the sending edge device, the user re-encoding ML model to be used in re-encoding audio and/or video that was compressed and sent be the sending user, wherein the re-encoded audio and/or video approximates the voice and/or images of the sending user (for example, edge device 101 may store a user-encoding ML model for the user of edge device 141); and 3) a re-encoding ML model to be used in lieu of a user re-encoding ML model for the sender (such as a generic re-encoding ML model, a re-encoding model of famous person, etc.) to be used in re-encoding an approximation of the audio and/or video that was sent.

User compression ML models may come in different forms. In some embodiments, a user compression ML model includes a recurrent neural network (RNN) capable of converting speech to text. The RNN may be used in conjunction with other techniques such as long short-term memory (LSTM) and/or hidden Markov models (HMM) in the hidden layers of the RNN. Depending upon the embodiment, outputs from the various layers of the user compression ML model (such as an RNN) provide as an "intermediate" representation compression of the audio and/or video input to be sent and then re-encoded by the recipient device. In some embodiments, the intermediate compression includes compressed audio and/or video and metadata about the compressed audio and/or video. In other embodiments, a text output of the user compression ML model is sent and then re-encoded by the recipient device. In other embodiments, a user compression ML model includes a convolutional neural network (CNN) capable of converting speech to text.

User re-encoding ML models may also come in many different forms. In some embodiments, a user re-encoding ML model includes a RNN capable of converting text to speech. The RNN may be used in conjunction with other techniques such as LSTM and/or HMM in the hidden layers of the RNN. Depending upon the embodiment, an "intermediate" representation compression from a user compression ML model is input to at least one layer of the user re-encoding ML model (such as an RNN) and used to re-encode the compressed audio and/or video input that was received. In some embodiments, the intermediate compression includes compressed audio and/or video and metadata about the compressed audio and/or video. In other embodiments, the text output of the user compression ML model that was received sent is re-encoded by the recipient device. In other embodiments, a user re-encoding ML model includes a CNN capable of converting text to speech.

In some embodiments, memory 119, 159 of one or more of the edge devices 101, 141 includes a ML model generator 115, 155 to generate and/or train one, or both, or a user compression ML model and a user re-encoding ML model. In some embodiments, training is performed by overlaying personality features onto a baseline model.

In some embodiments, a web services provider 121 includes hardware execution resources 137 to execute software stored or accessible to the web services provider 121 and storage 133 to store a communication program 115 to be used in the communication between users of the edge devices 101, 141. For example, the communication program 115 is enterprise support for one or more telecommunications applications running on the edge devices 101, 141 such as those detailed above.

Exemplary hardware execution resources 118, 137, 158 include, but are not limited to graphics processing units, central processing units, application specific integrated circuits, field programmable gate arrays, combinations thereof, etc. Typically, training of ML models is performed on hardware other than on central processing units. Depending on the embodiment, the re-encoding may also be performed on hardware other than on central processing units if available.

In some embodiments, the web services provider 121 stores ML models 111, 151 that may be utilized in a compression/re-encode scheme as detailed herein. As such the web services provider 121 acts as a repository for these ML models 111, 151 and can provide one or more of these ML models 111, 151 as needed.

In some embodiments, the web services provider 121 a ML model generator 131 to generate and/or train one, or both, or a user compression ML model and a user re-encoding ML model to be stored at the web services provider 121 and/or stored by the edge devices 101, 141.

In the illustration, there are several circles with numbers inside. These circles represent embodiments of actions performed. At circle 1, the edge device 0 101 attempts to initiate a communication between itself and the edge device 1 141. In particular, the communication program 113 causes an initiation of an attempt to create a communication link between the two edge devices 101, 141 ("initiation request"). Depending upon the embodiment, the web services provider 121 is involved in this initiation (and, in some instances, continues to be involved after the initiation).

At circle 2, the edge device 1 141 receives the initiation request. The contents of the initiation request vary depending upon the embodiment utilized. In some embodiments, the initiation request includes a user re-encoding ML model for the user of edge device 0 101. In other embodiments, the initialization request includes a link to a re-encoding ML model. In other embodiments, this exchange occurs after initialization (such as at circle 4).

At circle 3, the edge device 1 141 acknowledges the initiation request and the communication link is created. Again, this link may flow through the web services provider 121, or be peer-to-peer, dependent upon the embodiment. In some embodiments, the acknowledgment includes a user re-encoding ML model for the user of edge device 1 141. In other embodiments, the initialization request includes a link to a re-encoding ML model. In other embodiments, this exchange occurs after initialization (such as at circle 4). One or more of the edge devices 101, 141 and/or the web services provider 121 determines the bandwidth of the communication link upon creation its creation and/or during the creation of the communication. This determination may be used to a set a level of compression to be used.

At circle 4, the edge devices 101, 141 communicate with each other using the initialized communication link.

At circle 5, each communication program 113, 153 of the edge devices 101, 141 uses its user's user compression ML model to compress input audio and/or video content from its user and transmits that compressed content to the other device. Additionally, each communication program 113, 153 of the edge devices 101, 141 uses the other user's user re-encoding ML model to take compressed content received over the communication link to generate a voice and/or audio representation of the other user from the compressed content. When a re-encoding ML model is not available, in some embodiments a default model is used.

Figure 2:
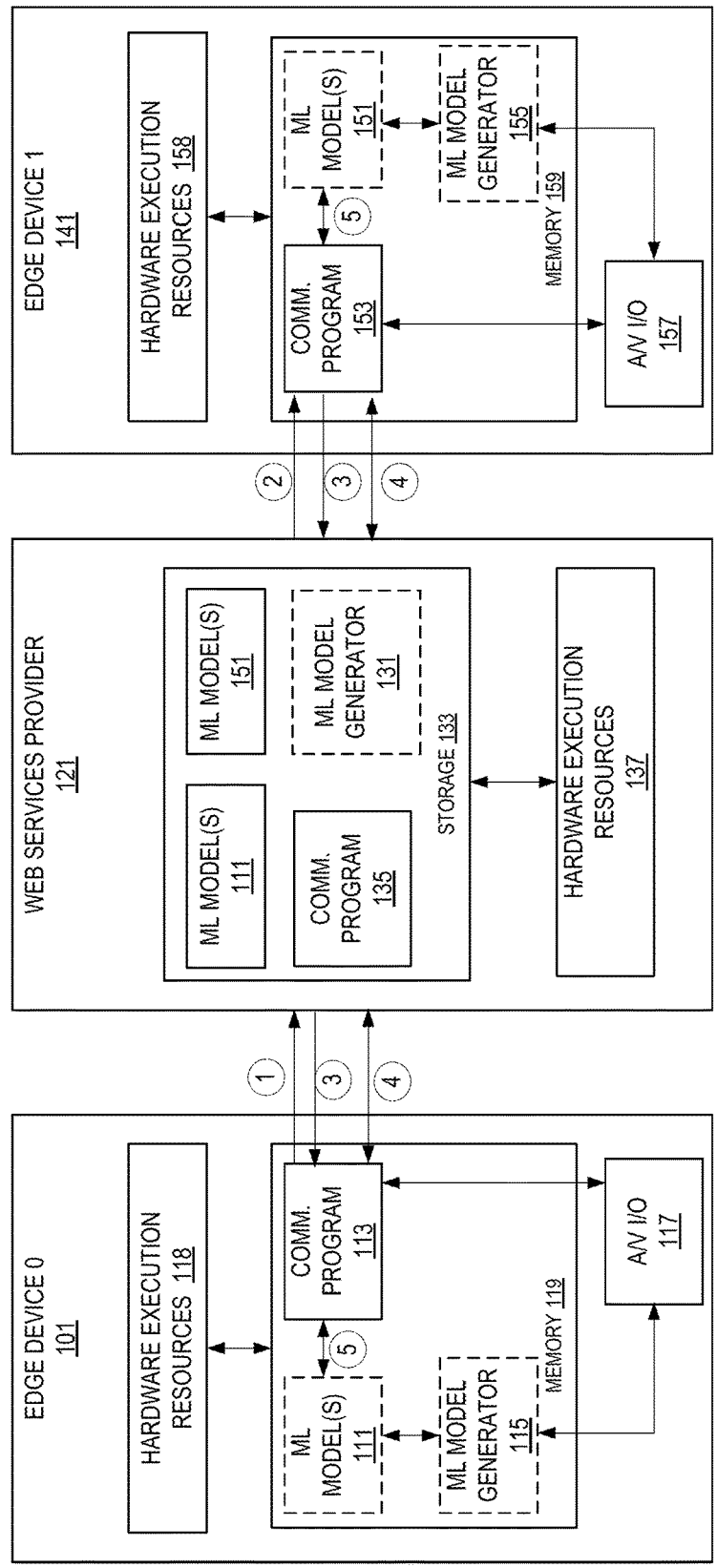
FIG. 2 illustrates examples of embodiments that support using at least one ML model for an audio and/or visual communication using an intermediary.

FIG. 2 illustrates examples of embodiments that support using at least one ML model for an audio and/or visual communication using an intermediary. In the illustration, there are several circles with numbers inside. These circles represent embodiments of actions performed. At circle 1, the edge device 0 101 attempts to initiate a communication between itself and the edge device 1 141. In particular, the communication program 113 causes an initiation of an attempt to create a communication link between the two edge devices 101, 141 ("initiation request"). In these embodiments, the web services provider 121 is involved in this initiation (and, in some instances, continues to be involved after the initiation).

At circle 2, the edge device 1 141 receives the initiation request. The contents of the initiation request vary depending upon the embodiment utilized. For example, in some embodiments, the initiation request includes a re-encoding ML model to use during the communication. In other embodiments, the initiation request includes a link to a user re-encoding ML model for the user of edge device 0 101 that is stored by the web services provider 121. In other embodiments, this exchange occurs after initialization (such as at circle 4), but the ML models to use are provided by the web services provider 121.

At circle 3, the edge device 1 141 acknowledges the initiation request and the communication link is created. Again, this link may flow through the web services provider 121, or be peer-to-peer, dependent upon the embodiment. In some embodiments, the acknowledgment includes a user re-encoding ML model for the user of edge device 1 141. In other embodiments, the initialization request includes a link to a re-encoding ML model. In other embodiments, this exchange occurs after initialization (such as at circle 4). One or more of the edge devices 101, 141 and/or the web services provider 121 determines the bandwidth of the communication link upon creation its creation and/or during the creation of the communication. This determination may be used to a set a level of compression to be used.

At circle 4, the edge devices 101, 141 communicate with each other using the initialized communication link.

At circle 5, each communication program 113, 153 of the edge devices 101, 141 uses its user's user compression ML model to compress input audio and/or video content from its user and transmits that compressed content to the other device. Additionally, each communication program 113, 153 of the edge devices 101, 141 uses the other user's user re-encoding ML model to take compressed content received over the communication link to generate a voice and/or audio representation of the other user from the compressed content.

Figure 3:
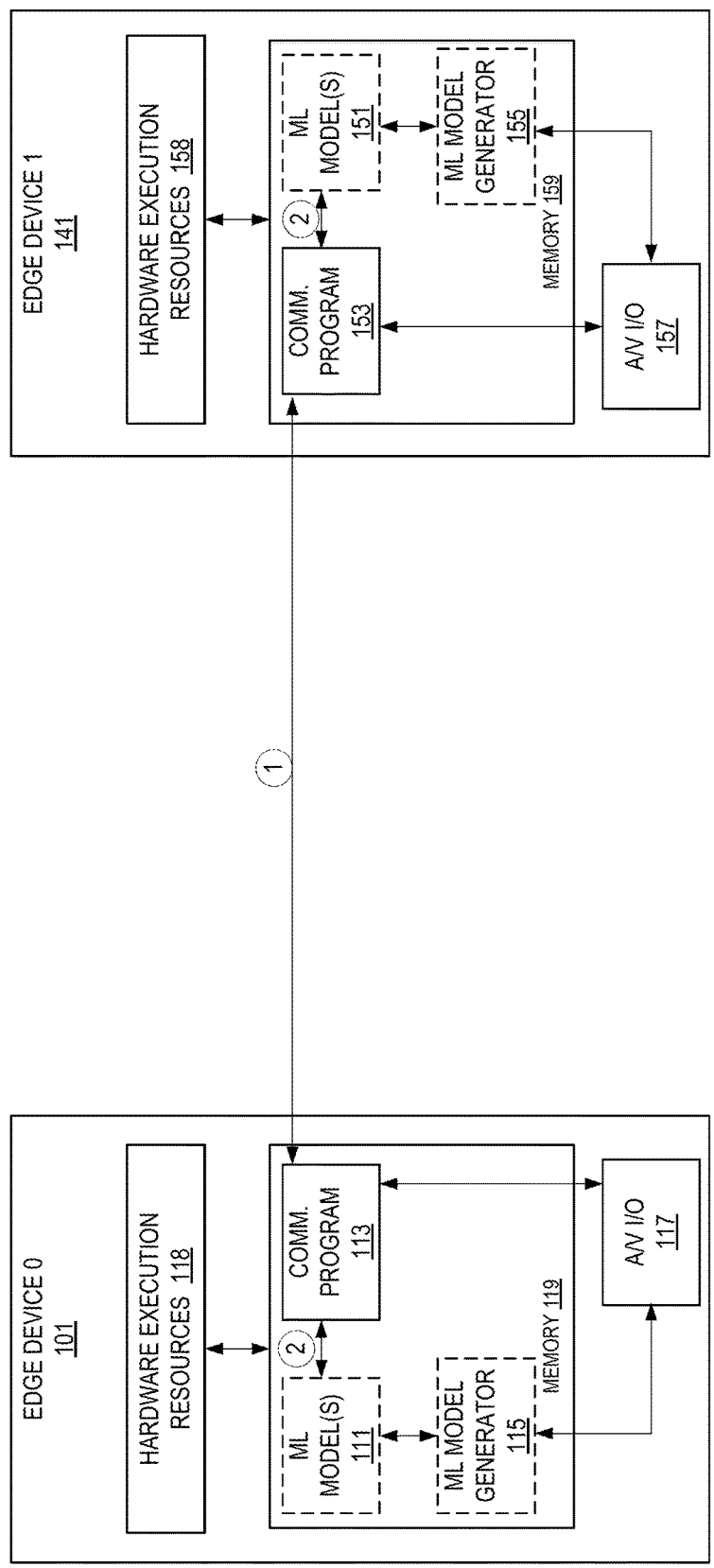
FIG. 3 illustrates examples of embodiments that support using at least one ML model for an audio and/or visual communication.

FIG. 3 illustrates examples of embodiments that support using at least one ML model for an audio and/or visual communication. In the illustration, there are several circles with numbers inside. These circles represent embodiments of actions performed.

At circle 1, the edge device 0 101 attempts to initiate a communication between itself and the edge device 1 141. In particular, the communication program 113 causes an initiation of an attempt to create a peer-to-peer communication link between the two edge devices 101, 141 ("initiation request"). One or more of the edge devices 101, 141 determines the bandwidth of the communication link upon creation its creation and/or during the creation of the communication. Any needed ML model to be used is sent at this time.

At circle 2, each communication program 113, 153 of the edge devices 101, 141 uses its user's user compression ML model to compress input audio and/or video content from its user and transmits that compressed content to the other device. Additionally, each communication program 113, 153 of the edge devices 101, 141 uses the other user's user re-encoding ML model to take compressed content received over the communication link to generate a voice and/or audio representation of the other user from the compressed content.

Figure 4:
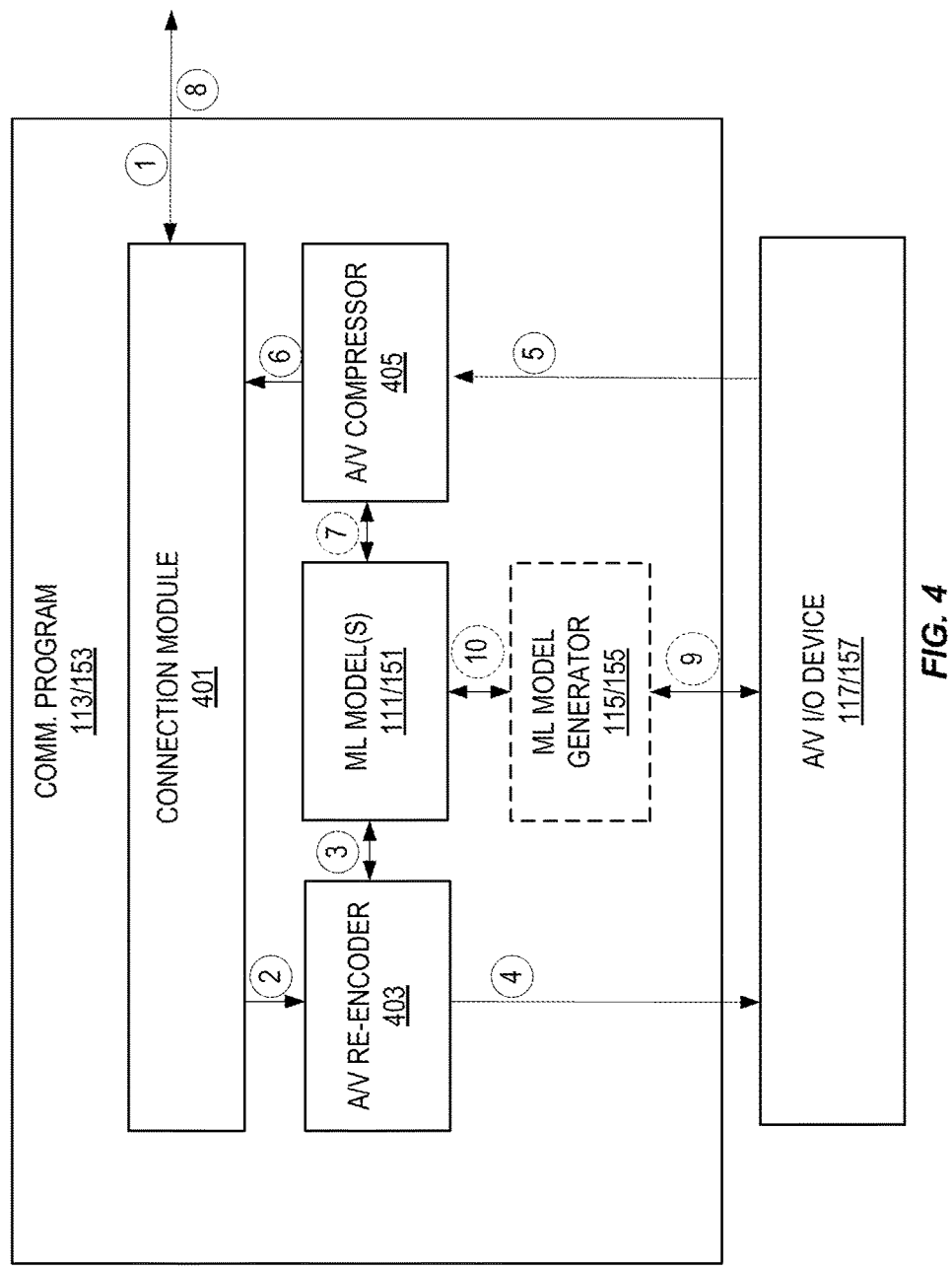
FIG. 4 illustrates embodiments of components included in, or utilized by, an edge device communication program utilizing ML model compression and/or re-encode.

FIG. 4 illustrates embodiments of components included in, or utilized by, an edge device communication program utilizing ML model compression and/or re-encode. As detailed above, the communication program 113, 153 is stored in memory and executed by a hardware processor (not shown in this figure). In this example, ML model(s) 111/151 encompasses both compression and re-encoding ML models.

A connection module 401 is used to make a connection with another edge device either through an intermediary (such as a web services provider) or peer-to-peer.

Audio and/or video re-encoder 403 utilizes the sender's user re-encoding ML model 111/151 (if available, or a different re-encoding ML model if not) to re-encode compressed audio and/or video received over the connection module 401 to be played by an audio and/or video device 117/157. For example, in some embodiments, the audio and/or video re-encoder 403 takes text sent from the other edge device and re-encodes this as audio that is to be output as a representation of the user of the other edge device. In other embodiments, the audio and/or video re-encoder 403 takes intermediate content sent from the other edge device and re-encodes this as audio that is to be output as a representation of the user of the other edge device.

Audio and/or video compressor 405 utilizes the compression ML model 111/151 of the user of the communication program 113/153 to compress audio and/or video received from the user via an audio and/or video device 117/157. The compressed audio and/or video is sent via the connection module 401.

In the illustration, there are several circles with numbers inside. These circles represent embodiments of actions performed. At circle 1, a communication link is established as detailed above.

At circle 2, the connection module 401 passes compressed content received from the other edge device to the audio and/or video re-encoder 403. At circle 3, the audio and/or video re-encoder 403 utilizes the user re-encoding ML model 111/151 for the user of the other edge device to re-encode the compressed content (if available, or a different re-encoding ML model if not) as detailed above.

The re-encoded content is provided to the audio and/or video device 117/157 at circle 4 to be played.

At circle 7, the audio and/or video compressor 405 utilizes the compressor ML model 111/151 for the user of the communication program 113/153 of the edge device to compress input from the audio and/or video device 117/157 at circle 5. Depending upon the embodiment, the compressed input is text, an intermediate representation, etc.

The compressed content is then provided to the connection module 401 at circle 6 which transmits the compressed content to the other edge device at circle 8.

In some embodiments, a ML model generator 115/155 executes during the operation of the communication program 113/153 at circle 9 to train/update the user re-encoding ML model and/or user compression ML model of user of the communication program 113/153 at circle 10.

Note that in some embodiments, various aspects that are shown inside of the communication program 113/153 are not included in the program itself, but accessible to it (such as the ML models 111/151).

Figure 5:
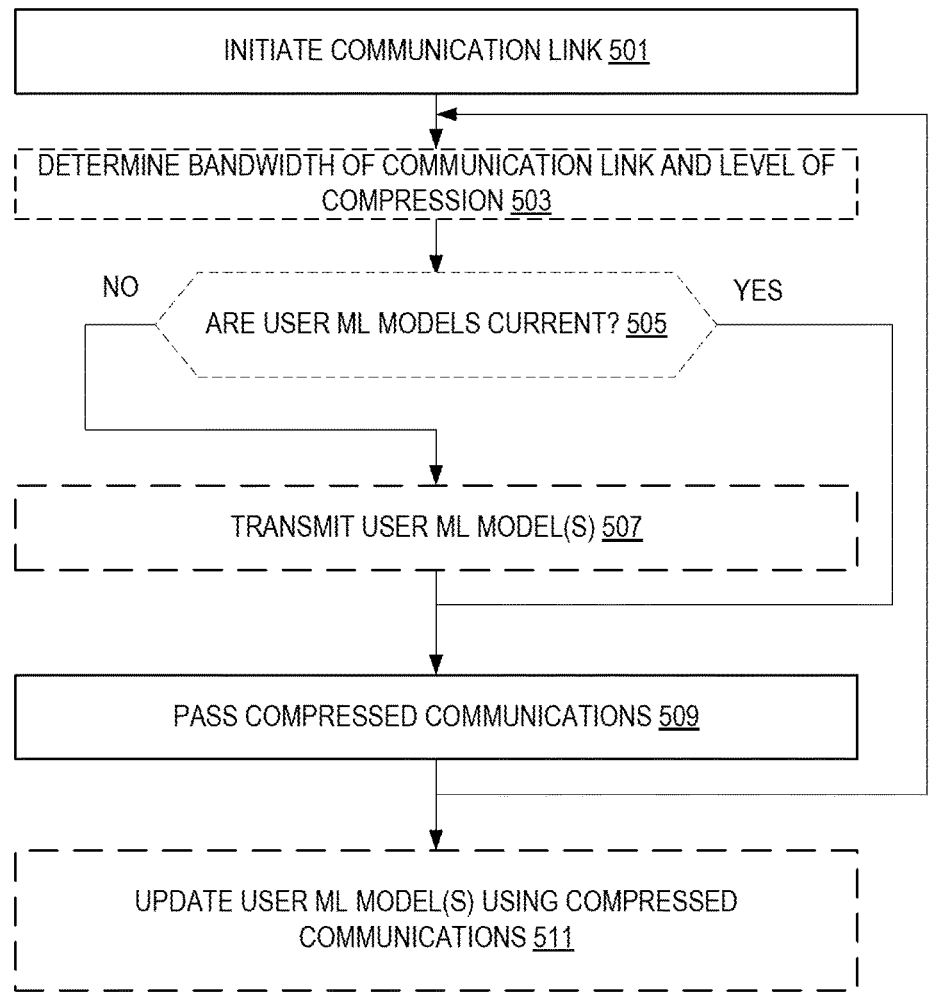
FIG. 5 illustrates embodiments of a flow of a method for using user ML model(s) in communications.

FIG. 5 illustrates embodiments of a flow of a method for using user ML model(s) in communications. In this illustration, the actions are performed by a web services provider, or other non-edge device entity.

At 501, a communication link is initiated between edge devices through the web services provider, or other non-edge device entity. This communication link allows the edge devices to communicate with each other through the web services provider, or other non-edge entity.

In some embodiments, the bandwidth of the communication link is determined at 503 and the determined bandwidth is used to set a level of compression to be used by one or more of the edge devices. For example, when the bandwidth is poor for both parties, then a higher level of compression (such as text) is to be used in some embodiments rather than an intermediate level of compression (such an output of an intermediate layer of a RNN).

In some embodiments, a determination of whether the ML models are current in the edge devices is made at 505. This determination may be made by asking the responsible party (such as the edge devices) for an indication of a latest version of the ML models available. In some embodiments, when there is no ML model specific to a user, a determination is made as to if the ML model to be used is current is made at 505. For example, is a generic ML model for either compression or re-encoding current?

When the user ML models are not current, then the user ML models needed to do re-encoding and/or compression are transmitted at 507.

When the user ML models are current in the edge devices, then compressed communications are passed through the web services provider, or other non-edge device, to/from the edge devices at 509.

In some embodiments, at 511, ML model(s) of the web services provider, are updated using the compressed communications. For example, a ML model generator trains one, or both, or a user compression ML model and a user re-encoding ML model stored at the web services provider.

Figure 6:
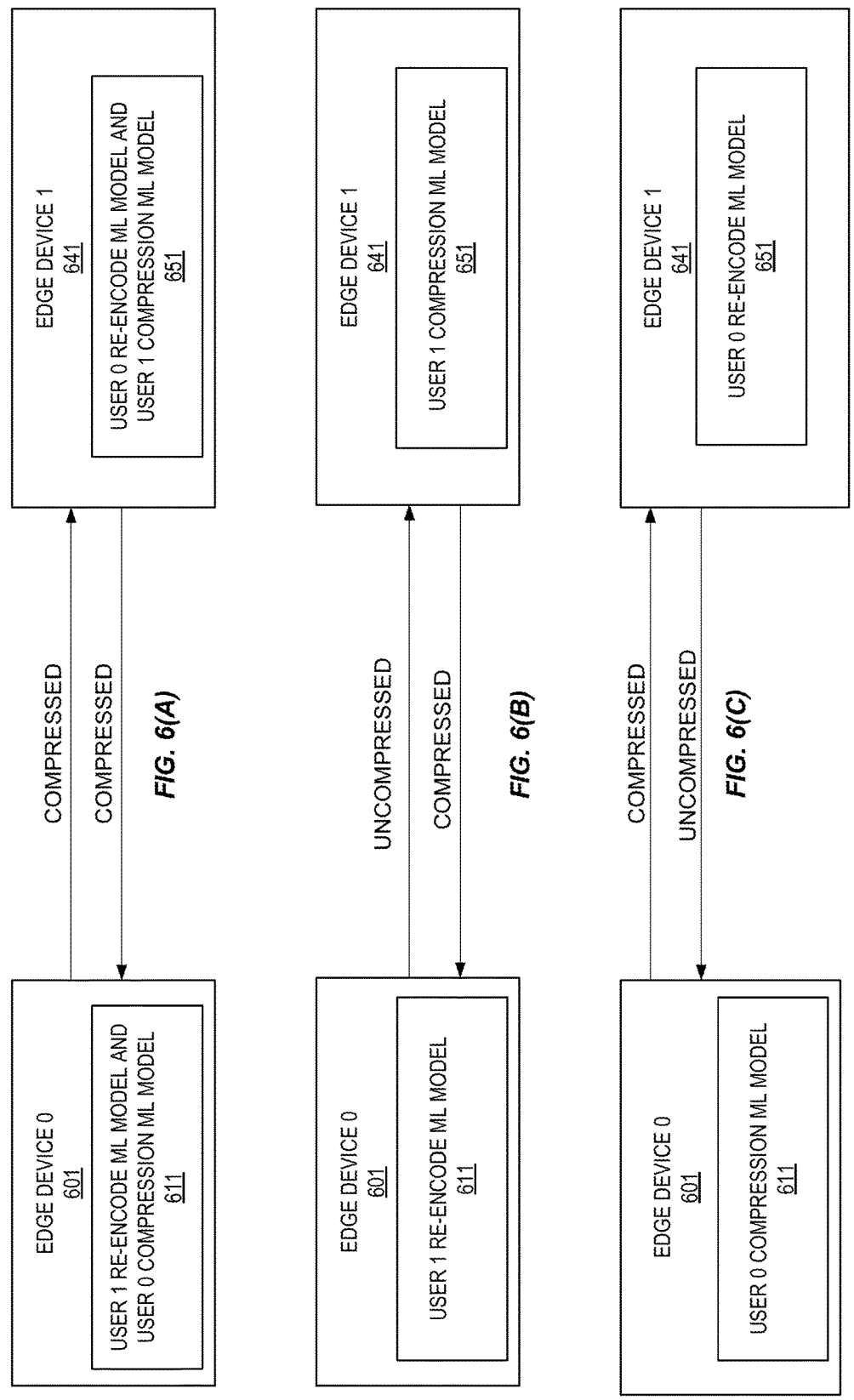
FIGS. 6(A)-(C) illustrate embodiments of use cases for ML model re-encoding in communications.

FIGS. 6(A)-(C) illustrate embodiments of use cases for ML model re-encoding in communications. These use cases show that there may be times when both edge devices use re-encoding ML models and others when not all edge devices use re-encoding ML models. When compression is not needed, the re-encoding ML models are similarly not needed. In these example, the "user" does not necessarily mean a ML model the is specific to a particular user. For example, a generic ML model (or one associated with a famous person, etc.) may be used. As such, "user 1" or "user 2" are shown to indicate which ML model the device is to use (in other words, one for that device for compression (typically associated with the user of the device), or one provided by some other entity (such as the user of the other device, famous person, etc.)

FIG. 6(A) illustrates an embodiment where edge device 0 and edge device 1 both use re-encoding ML models to re-encode content sent from the other party. As shown both edge devices 601, 641 compress content from their respective users and the recipient edge device uses a re-encoding ML model 611 or 651 corresponding to the compressor to generate audio and/or video content to present to the user of the recipient edge device, and uses a re-encoding ML model corresponding to the sender. A typical scenario for this use case is that both edge devices 601, 641 have poor upload and download speeds (or unreliable upload and download).

FIG. 6(B) illustrates an embodiment where edge device 0 only uses a re-encoding ML model to re-encode content sent from the other party. As shown edge device 1 641 compresses content from its respective user using a compression model 651 and the recipient edge device (edge device 0 601) uses a re-encoding ML model 611 corresponding to the user of edge device 1 641 to generate audio and/or video content to present to the user of the recipient edge device. A typical scenario for this use case is that edge device 0 601 has a poor download speed (or unreliable download), but good upload speed.

FIG. 6(C) illustrates an embodiment where edge device 1 only uses a re-encoding ML model to re-encode content sent from the other party. As shown edge device 0 601 compresses content from its respective user using a compression model 611 and the recipient edge device (edge device 1 641) uses a re-encoding ML model 651 corresponding to the user of edge device 0 601 to generate audio and/or video content to present to the user of the recipient edge device. A typical scenario for this use case is that edge device 1 641 has a poor download speed (or unreliable download, but good upload speed).

Figure 7:
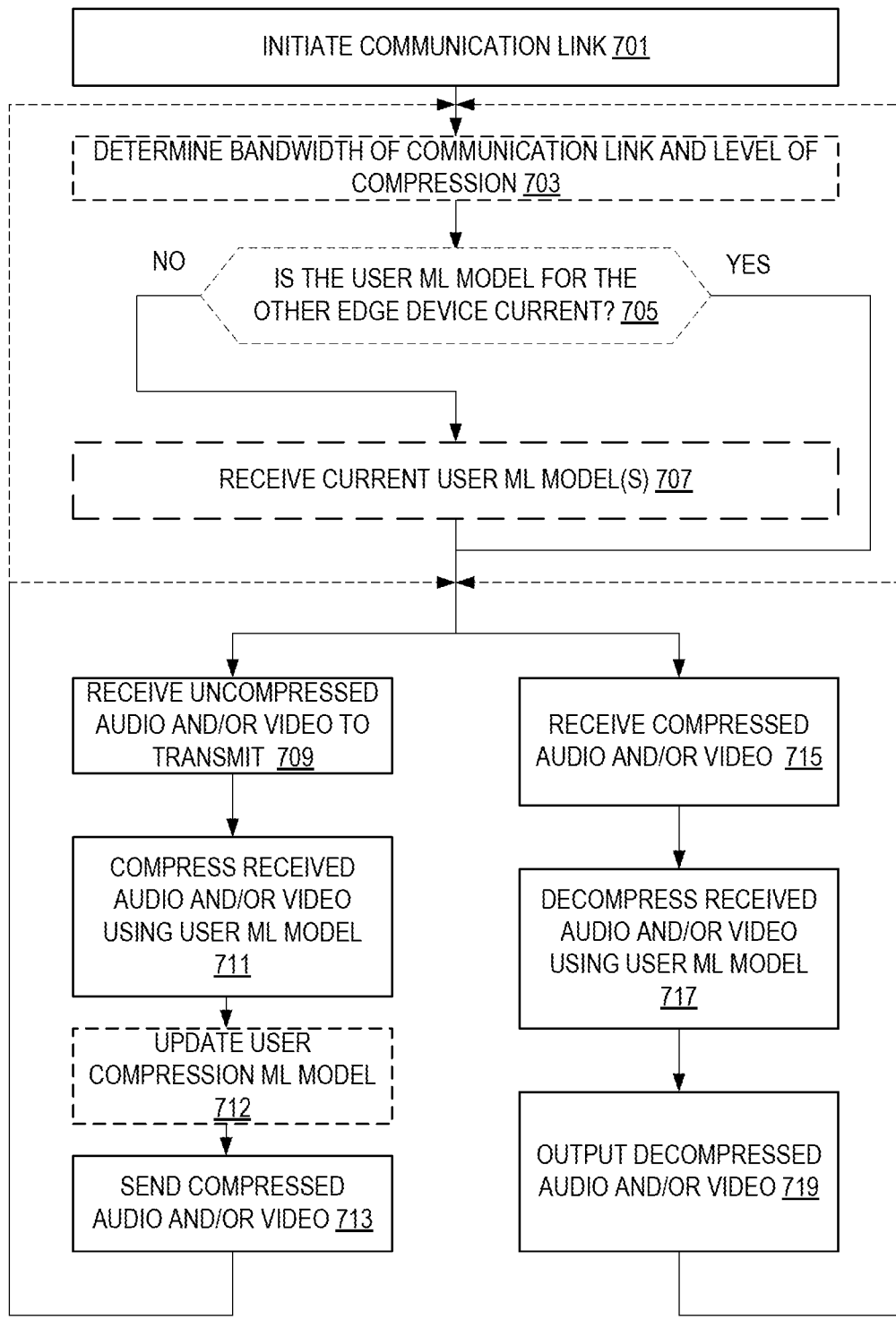
FIG. 7 illustrates embodiments of a flow of a method for using ML model(s) in communications.

FIG. 7 illustrates embodiments of a flow of a method for using ML model(s) in communications. In this illustration, the actions are performed by an edge device. In particular, in some embodiments, the communication program running on the edge device performs these embodiments. This flow is akin to what happens to support the case of FIG. 6(A) in some embodiments.

At 701, a communication link is initiated between the edge device to another edge device. This communication link allows the edge devices to communicate with each other. The communication link may be peer-to-peer, or use a third party as an intermediary.

In some embodiments, the bandwidth of the communication link is determined at 703 and the determined bandwidth is used to set a level of compression for the edge device to use in compressing its user's audio and/or video input. For example, when the bandwidth is poor, then a higher level of compression (such as text) is to be used in some embodiments rather than an intermediate level of compression (such an output of an intermediate layer of a RNN).

In some embodiments, a determination of whether the available user re-encoding ML model to be used to re-encode compressed content received from the other edge device is current is made at 705. This determination may be made by asking the responsible party (such as an intermediary or the other edge device) for an indication of a latest version. Note that the user re-encoding ML model does not need to be specific to the user of the other device. Other user re-encoding ML models may be used such as a default model or other model when a communication link is too poor to receive a ML model, or the other user has not generated a user re-encoding ML model.

In some embodiments, when the user re-encoding ML model to be used is not current, then a current user re-encoding ML model is received at 707. Alternatively, in some embodiments, user re-encoding ML models are always provided during the setup of the communication link, or within a short time during the communication. This user re-encoding ML model may come from the other edge device, or from a third party such as a web services provider intermediary.

During the communication between the edge devices, compressed audio and/or video from the other device is received and compressed audio and/or video to send the other device is generated and sent.

Uncompressed audio and/or video data to transmit is received at 709. For example, voice and/or video is provided by a user via a microphone and/or camera.

The user compression ML model of the user of the edge device is then used to compress the uncompressed audio and/or video data to transmit into compressed data at 711. In some embodiments, the level that the uncompressed audio and/or video data to transmit is to be compressed is determined based on the bandwidth. For example, in some embodiments, what layer of a RNN to output is determined such as an intermediate layer or a final output of text based on the determined bandwidth.

In some embodiments, the received uncompressed audio and/or video data is used to update/train the user compression ML model at 712. For example, a ML model generator trains a user compression ML model.

The compressed audio and/or video is transmitted to the other edge device at 713.

Compressed audio and/or video data from the other edge device is received at 715. For example, compressed voice and/or video of the other user is received by the communication link.

The user re-encoding ML model to be used is then used to re-encode the compressed audio and/or video data into uncompressed audio and/or video data at 717. In some embodiments, what layer of a RNN is to receive the compressed audio and/or video data is determined based on the level of compression determined by the bandwidth.

The uncompressed audio and/or video is output (to be played) at 719.

In some embodiments, the bandwidth of the communication link and level of compression are determined throughout the communication. For example, these are determined continually in some embodiments. In other embodiments, these are determined at periodic intervals.

Figure 8:
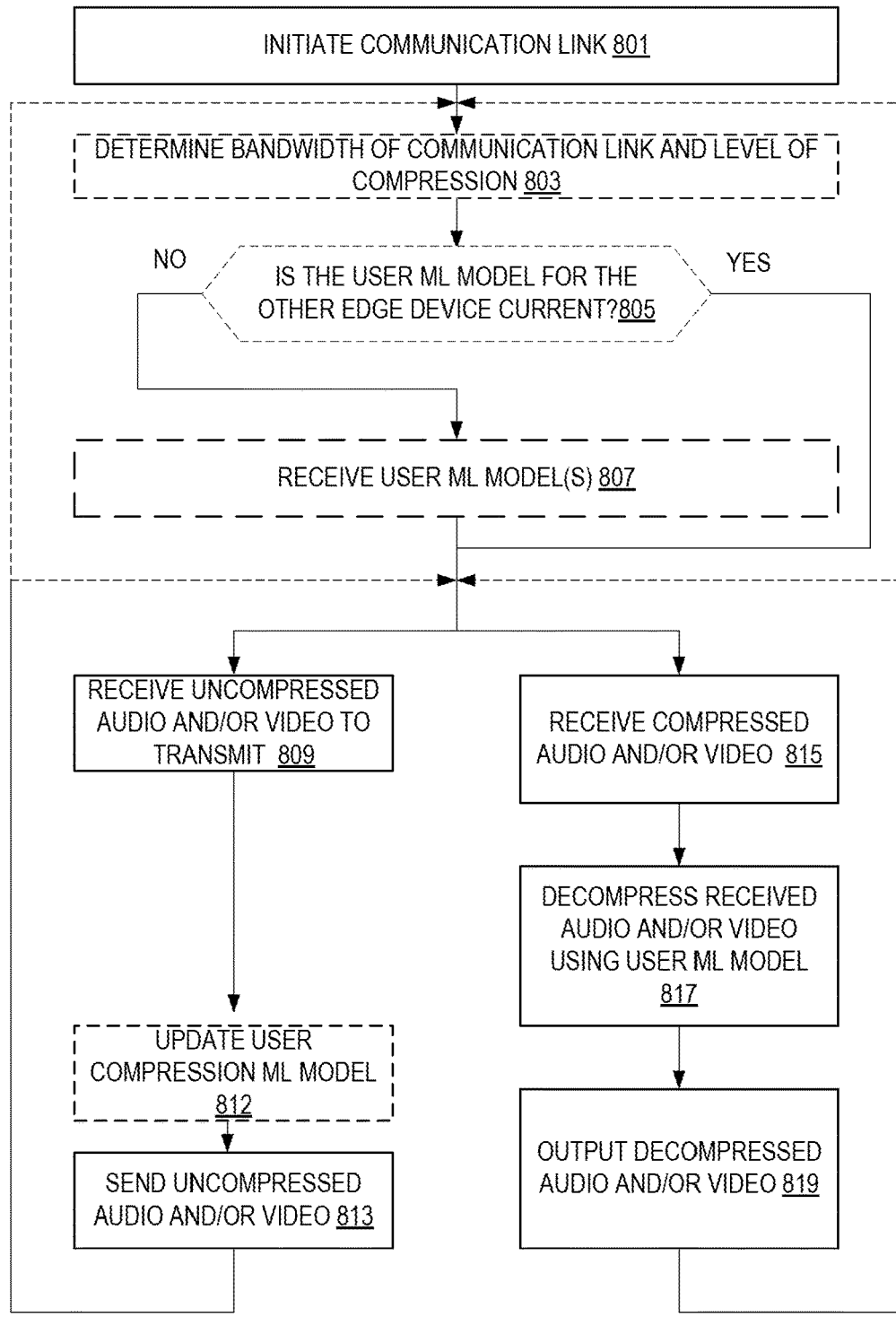
FIG. 8 illustrates embodiments of a flow of a method for using ML model(s) in communications.

FIG. 8 illustrates embodiments of a flow of a method for using ML model(s) in communications. In this illustration, the actions are performed by an edge device. In particular, in some embodiments, the communication program running on the edge device performs these embodiments. This flow is akin to what happens to support the case of FIG. 6(B) in some embodiments.

At 801, a communication link is initiated between the edge device to another edge device. This communication link allows the edge devices to communicate with each other. The communication link may be peer-to-peer, or use a third party as an intermediary.

In some embodiments, the bandwidth of the communication link is determined at 803 and the determined bandwidth is used to set a level of compression for the edge device to use in compressing its user's audio and/or video input. For example, when the bandwidth is poor, then a higher level of compression (such as text) is to be used in some embodiments rather than an intermediate level of compression (such an output of an intermediate layer of a RNN).

In some embodiments, a determination of whether the available user re-encoding ML model to be used to re-encode compressed content received from the other edge device is current is made at 805. This determination may be made by asking the responsible party (such as an intermediary or the other edge device) for an indication of a latest version. Note that the user re-encoding ML model does not need to be specific to the user of the other device. Other user re-encoding ML models may be used such as a default model or other model when a communication link is too poor to receive a ML model, or the other user has not generated a user re-encoding ML model.

In some embodiments, when the user re-encoding ML model to be used is not current, then a current user re-encoding ML model is received at 807. Alternatively, in some embodiments, user re-encoding ML models are always provided during the setup of the communication link, or within a short time during the communication. This user re-encoding ML model may come from the other edge device, or from a third party such as a web services provider intermediary.

During the communication between the edge devices, compressed audio and/or video from the other device is received and uncompressed audio and/or video to send the other device is generated and sent.

Uncompressed audio and/or video data to transmit is received at 809. For example, voice and/or video is provided by a user via a microphone and/or camera.

In some embodiments, the received uncompressed audio and/or video data is used to update/train the user compression ML model at 812. For example, a ML model generator trains a user compression ML model.

The compressed audio and/or video is transmitted to the other edge device at 813.

Compressed audio and/or video data from the other edge device is received at 815. For example, compressed voice and/or video of the other user is received by the communication link.

The user re-encoding ML model to be used is then used to re-encode the compressed audio and/or video data into uncompressed audio and/or video data at 817. In some embodiments, he what layer of a RNN is to receive the compressed audio and/or video data is determined based on the level of compression determined by the bandwidth.

The uncompressed audio and/or video is output (to be played) at 819.

In some embodiments, the bandwidth of the communication link and level of compression are determined throughout the communication. For example, these are determined continually in some embodiments. In other embodiments, these are determined at periodic intervals.

Figure 9:
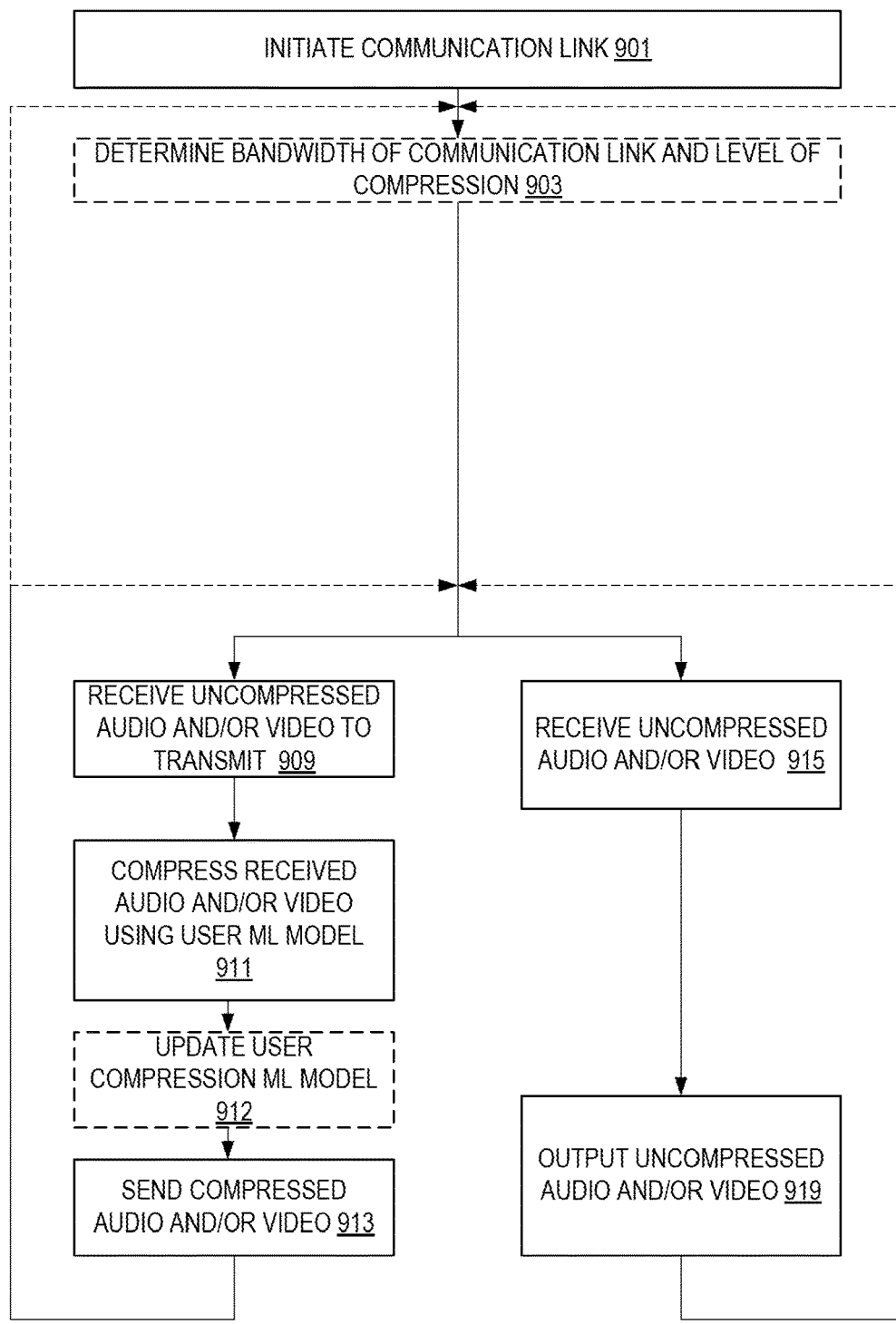
FIG. 9 illustrates embodiments of a flow of a method for using ML model(s) in communications.

FIG. 9 illustrates embodiments of a flow of a method for using ML model(s) in communications. In this illustration, the actions are performed by an edge device. In particular, in some embodiments, the communication program running on the edge device performs these embodiments. This flow is akin to what happens to support the case of FIG. 6(C) in some embodiments.

At 901, a communication link is initiated between the edge device to another edge device. This communication link allows the edge devices to communicate with each other. The communication link may be peer-to-peer, or use a third party as an intermediary.

In some embodiments, the bandwidth of the communication link is determined at 903 and the determined bandwidth is used to set a level of compression for the edge device to use in compressing its user's audio and/or video input. For example, when the bandwidth is poor, then a higher level of compression (such as text) is to be used in some embodiments rather than an intermediate level of compression (such an output of an intermediate layer of a RNN).

During the communication between the edge devices, uncompressed audio and/or video from the other device is received and compressed audio and/or video to send the other device is generated and sent.

Uncompressed audio and/or video data to transmit is received at 909. For example, voice and/or video is provided by a user via a microphone and/or camera.

The user compression ML model to be used is then used to compress the uncompressed audio and/or video data to transmit into compressed data at 911. In some embodiments, the level that the uncompressed audio and/or video data to transmit is compressed is determined by a determined level of compression based on the bandwidth. For example, in some embodiments, what layer of a RNN to output is determined such as an intermediate layer or a final output of text.

In some embodiments, the received uncompressed audio and/or video data is used to update/train the user compression ML model at 912. For example, a ML model generator trains a user compression ML model.

The compressed audio and/or video is transmitted to the other edge device at 913.

Uncompressed audio and/or video data from the other edge device is received at 915. For example, uncompressed voice and/or video of the other user is received by the communication link. Uncompressed in this context means that a user compression ML model has not been applied, not that no compression has occurred.

The uncompressed audio and/or video is output (played) at 919.

In some embodiments, the bandwidth of the communication link and level of compression are determined throughout the communication. For example, these are determined continually in some embodiments. In other embodiments, these are determined at periodic intervals.

Figure 10:
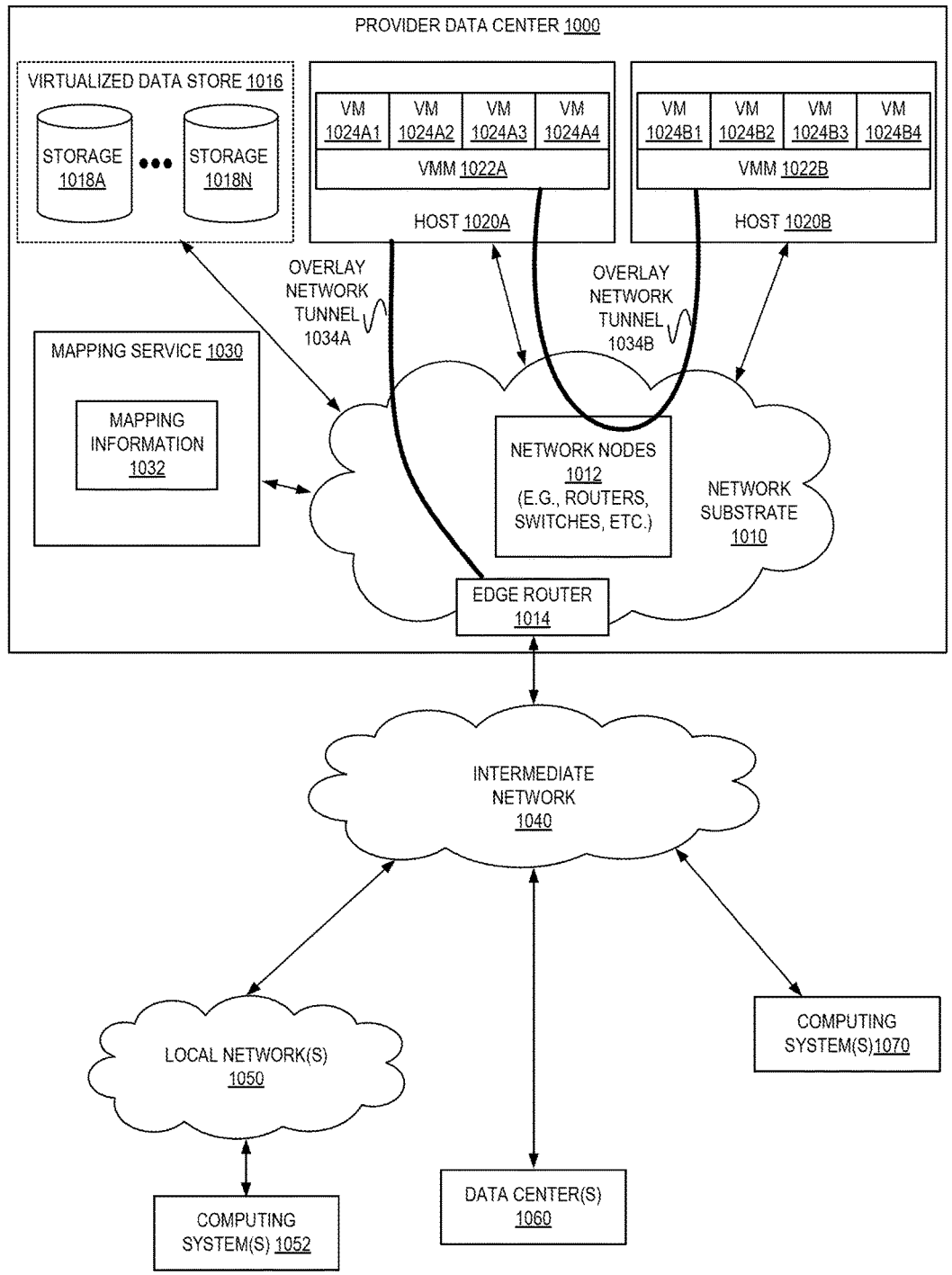
FIG. 10 illustrates an example data center that implements an overlay network on a network substrate using IP tunneling technology according to some embodiments.

FIG. 10 illustrates an example data center that implements an overlay network on a network substrate using IP tunneling technology, according to some embodiments. A provider data center 1000 may include a network substrate that includes networking nodes 1012 such as routers, switches, network address translators (NATs), and so on, which may be implemented as software, hardware, or as a combination thereof. Some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 10) and may provide a separate namespace for the overlay layer (the public IP addresses) and the network substrate 1010 layer (the local IP addresses). Packets in the overlay layer may be checked against a mapping directory (e.g., provided by mapping service 1030) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 1030) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 10, an example overlay network tunnel 1034A from a virtual machine (VM) 1024A (of VMs 1024A1-1024A4, via VMM 1022A) on host 1020A to a device on the intermediate network 1050 and an example overlay network tunnel 1034B between a VM 1024A (of VMs 1024A1-1024A4, via VMM 1022A) on host 1020A and a VM 1024B (of VMs 1024B1-1024B4, via VMM 1022B) on host 1020B are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 10, at least some networks in which embodiments may be implemented may include hardware virtualization technology that enables multiple operating systems to run concurrently on a host computer (e.g., hosts 1020A and 1020B of FIG. 10), i.e. as virtual machines (VMs) 1024 on the hosts 1020. The VMs 1024 may, for example, be executed in slots on the hosts 1020 that are rented or leased to customers of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more local IP addresses; the VMM 1022 on a host 1020 may be aware of the local IP addresses of the VMs 1024 on the host. A mapping service 1030 may be aware of (e.g., via stored mapping information 1032) network IP prefixes and IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 10 shows an example provider data center 1000 implementing a network that provides resource virtualization technology and that provides full Internet access via edge router(s) 1014 that connect to Internet transit providers, according to some embodiments. The provider data center 1000 may, for example, provide customers the ability to implement virtual computing systems (VMs 1024) via a hardware virtualization service and the ability to implement virtualized data stores 1016 on storage resources 1018A-1018N via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be instantiated on slots on hosts that are rented or leased to customers of the network provider, the hardware virtualization technology may also be used to provide other computing resources, for example storage resources 1018A-1018N, as virtualized resources to customers of a network provider in a similar manner.

Figure 11:
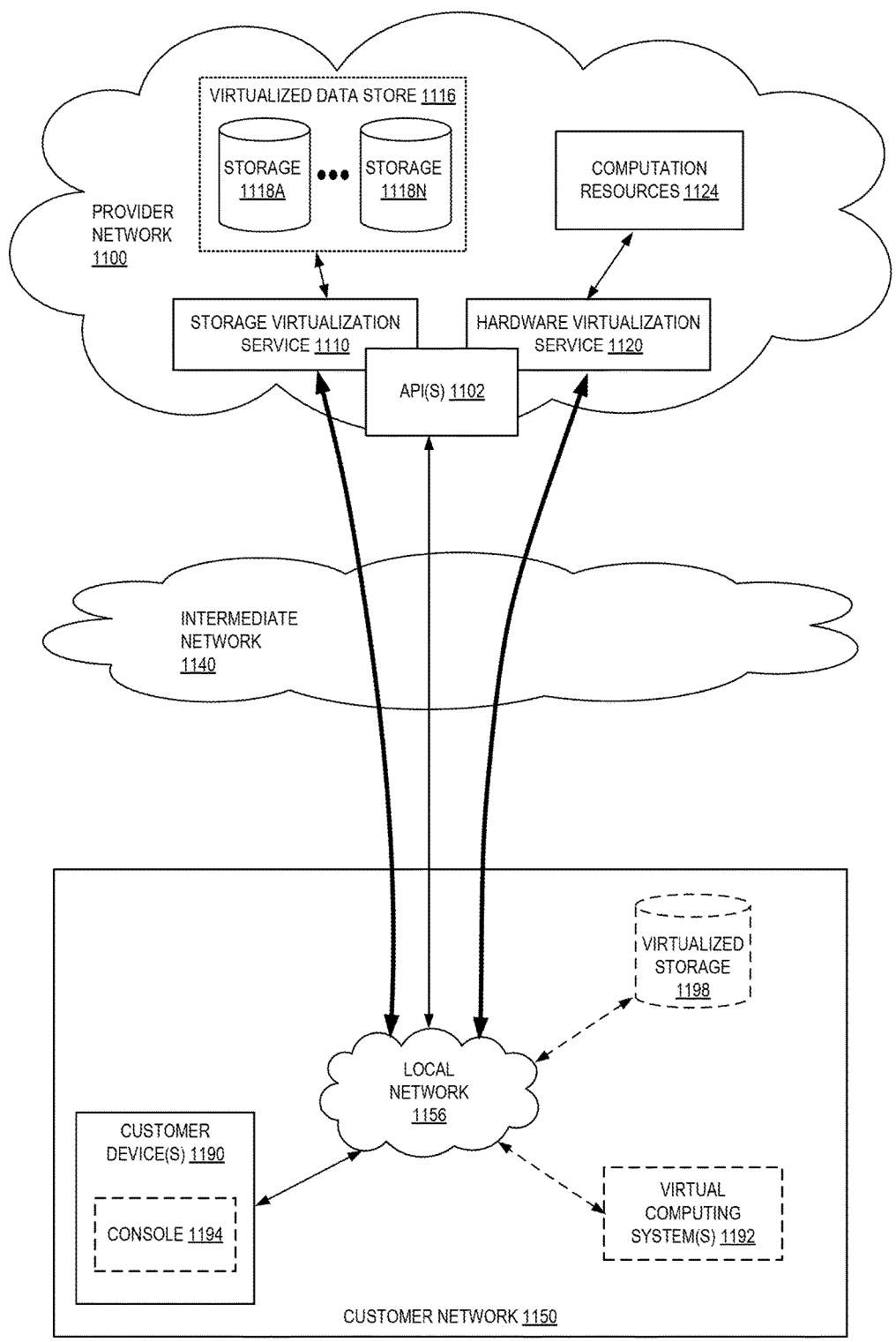
FIG. 11 is a block diagram of an example provider network that provides a storage virtualization service and a hardware virtualization service to customers according to some embodiments.

FIG. 11 is a block diagram of an example provider network that provides a storage virtualization service and a hardware virtualization service to customers, according to some embodiments. Hardware virtualization service 1120 provides multiple computation resources 1124 (e.g., VMs) to customers. The computation resources 1124 may, for example, be rented or leased to customers of the provider network 1100 (e.g., to a customer that implements customer network 1150). Each computation resource 1124 may be provided with one or more local IP addresses. Provider network 1100 may be configured to route packets from the local IP addresses of the computation resources 1124 to public Internet destinations, and from public Internet sources to the local IP addresses of computation resources 1124.

Provider network 1100 may provide a customer network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a customer network 1150 may access functionality provided by the hardware virtualization service 1120, for example via a console 1194 (e.g., a web-based application, standalone application, mobile application, etc.). In some embodiments, at the provider network 1100, each virtual computing system 1192 at customer network 1150 may correspond to a computation resource 1124 that is leased, rented, or otherwise provided to customer network 1150.

From an instance of a virtual computing system 1192 and/or another customer device 1190 (e.g., via console 1194), the customer may access the functionality of storage virtualization service 1110, for example via one or more APIs 1102, to access data from and store data to storage resources 1118A-1118N of a virtual data store 1116 provided by the provider network 1100. In some embodiments, a virtualized data store gateway (not shown) may be provided at the customer network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In some embodiments, a user, via a virtual computing system 1192 and/or on another customer device 1190, may mount and access virtual data store 1116 volumes, which appear to the user as local virtualized storage 1198.

While not shown in FIG. 11, the virtualization service(s) may also be accessed from resource instances within the provider network 1100 via API(s) 1102. For example, a customer, appliance service provider, or other entity may access a virtualization service from within a respective virtual network on the provider network 1100 via an API 1102 to request allocation of one or more resource instances within the virtual network or within another virtual network.

Figure 12:
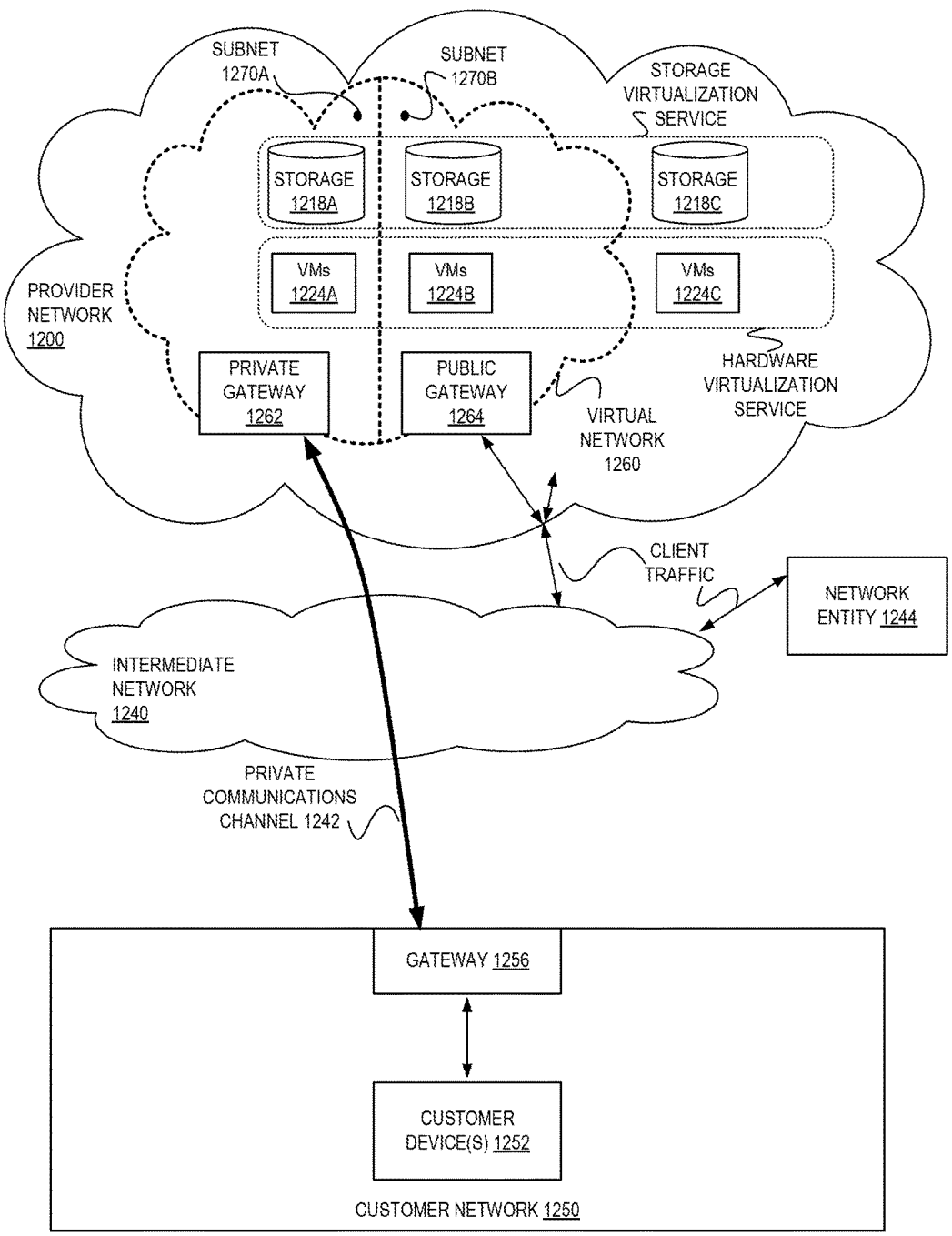
FIG. 12 illustrates an example provider network that provides virtual networks on the provider network to at least some customers according to some embodiments.

FIG. 12 illustrates an example provider network that provides virtual networks on the provider network to at least some customers, according to some embodiments. A customer's virtual network 1260 on a provider network 1200, for example, enables a customer to connect their existing infrastructure (e.g., one or more customer devices 1252) on customer network 1250 to a set of logically isolated resource instances (e.g., VMs 1224A and 1224B and storage 1218A and 1218B), and to extend management capabilities such as security services, firewalls, and intrusion detection systems to include their resource instances.

A customer's virtual network 1260 may be connected to a customer network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtual network 1260 and customer network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 1260 for a customer on provider network 1200, one or more resource instances (e.g., VMs 1224A and 1224B and storage 1218A and 1218B) may be allocated to the virtual network 1260. Note that other resource instances (e.g., storage 1218C and VMs 1224C) may remain available on the provider network 1200 for other customer usage. A range of public IP addresses may also be allocated to the virtual network 1260. In addition, one or more networking nodes (e.g., routers, switches, etc.) of the provider network 1200 may be allocated to the virtual network 1260. A private communications channel 1242 may be established between a private gateway 1262 at virtual network 1260 and a gateway 1256 at customer network 1250.

In some embodiments, in addition to, or instead of, a private gateway 1262, virtual network 1260 may include a public gateway 1264 that enables resources within virtual network 1260 to communicate directly with entities (e.g., network entity 1244) via intermediate network 1240, and vice versa, instead of or in addition to via private communications channel 1242.

Virtual network 1260 may be, but is not necessarily, subdivided into two or more subnetworks, or subnets, 1270. For example, in implementations that include both a private gateway 1262 and a public gateway 1264, a virtual network 1260 may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The customer may assign particular customer public IP addresses to particular resource instances in virtual network 1260. A network entity 1244 on intermediate network 1240 may then send traffic to a public IP address published by the customer; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the local IP address of the resource instance.

Some embodiments may allow a customer to remap public IP addresses in a customer's virtual network 1260 as illustrated in FIG. 12 to devices on the customer's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the customer network 1250. From the perspective of the network entity 1244, it appears as if the network entity 1244 is communicating with the public IP address of the customer on the provider network 1200. However, the network entity 1244 has actually communicated with the endpoint on customer network 1250.

While FIG. 12 shows network entity 1244 on intermediate network 1240 and external to provider network 1200, a network entity may be an entity on provider network 1200. For example, one of the resource instances provided by provider network 1200 may be a network entity that sends traffic to a public IP address published by the customer.

Illustrative System

Figure 13:
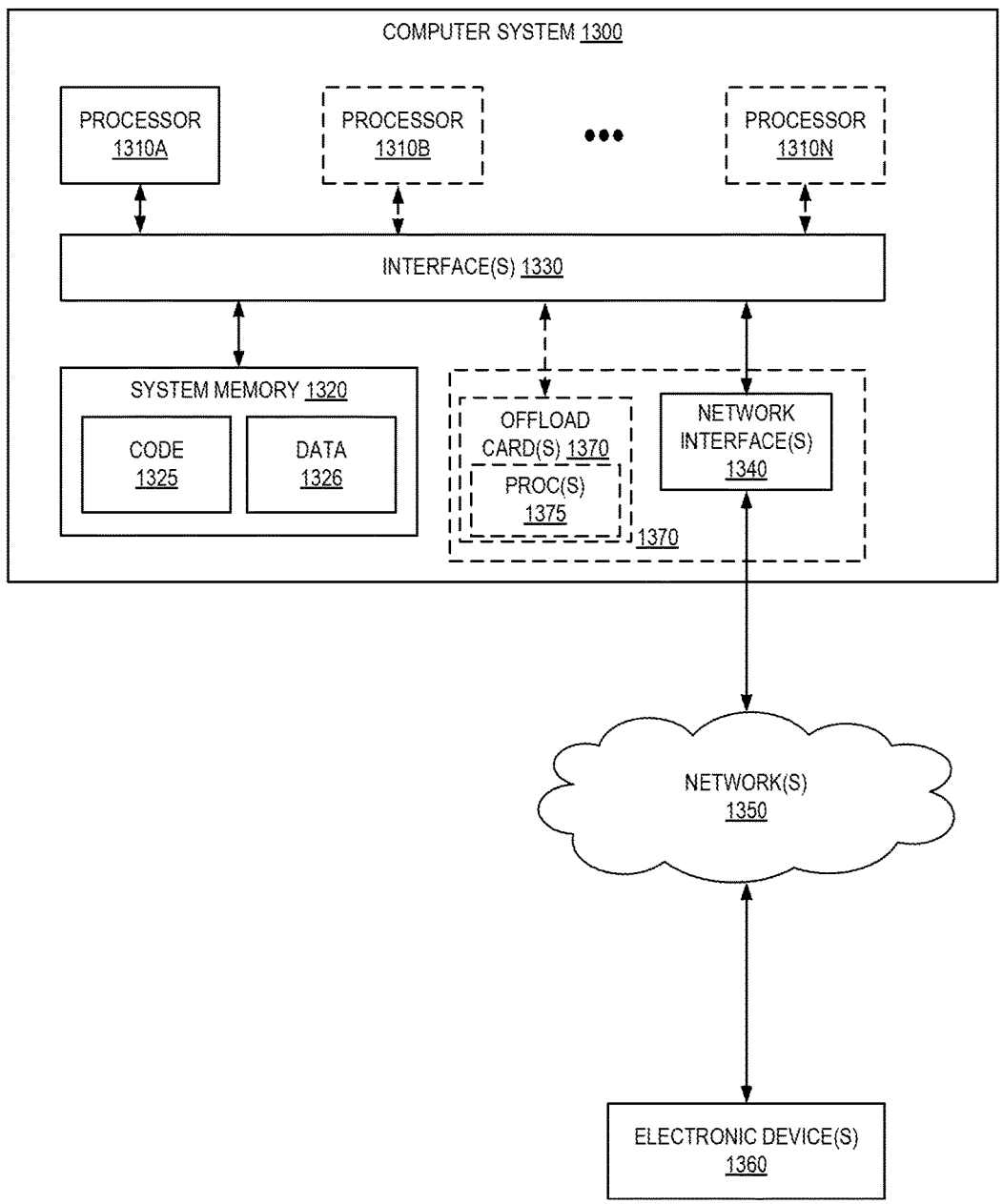
FIG. 13 is a block diagram illustrating an example computer system that may be used in some embodiments.

In some embodiments, a system that implements a portion or all of the techniques for using ML models in communications as described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG.

1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities, and may not coordinate with (or service) any hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Figure 14:
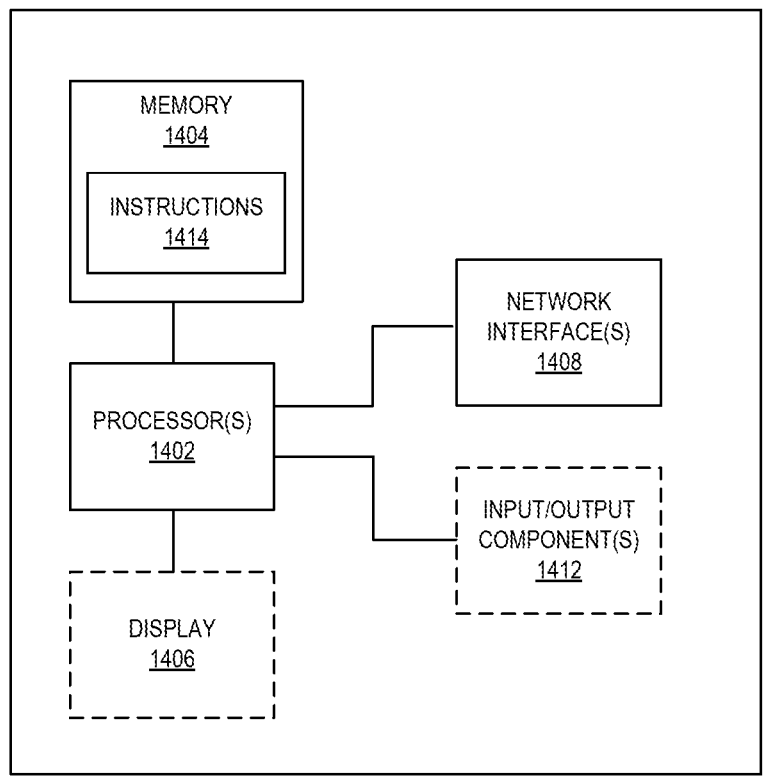
FIG. 14 illustrates a logical arrangement of a set of general components of an exemplary computing device that can be utilized in accordance with various embodiments.

FIG. 14 illustrates a logical arrangement of a set of general components of an example computing device 1400 such as an edge device, etc. Generally, a computing device 1400 can also be referred to as an electronic device. The techniques shown in the figures and described herein can be implemented using code and data stored and executed on one or more electronic devices (e.g., a client end station and/or server end station). Such electronic devices store and communicate (internally and/or with other electronic devices over a network) code and data using computer-readable media, such as non-transitory computer-readable storage media (e.g., magnetic disks, optical disks, Random Access Memory (RAM), Read Only Memory (ROM), flash memory devices, phase-change memory) and transitory computer-readable communication media (e.g., electrical, optical, acoustical or other form of propagated signals, such as carrier waves, infrared signals, digital signals). In addition, such electronic devices include hardware, such as a set of one or more processors 1402 (e.g., wherein a processor is a microprocessor, controller, microcontroller, central processing unit, digital signal processor, application specific integrated circuit, field programmable gate array, other electronic circuitry, a combination of one or more of the preceding) coupled to one or more other components, e.g., one or more non-transitory machine-readable storage media (e.g., memory 1404) to store code (e.g., instructions 1414) and/or data, and a set of one or more wired or wireless network interfaces 1408 allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses and possibly bridges). Thus, the non-transitory machine-readable storage media (e.g., memory 1404) of a given electronic device typically stores code (e.g., instructions 1414) for execution on the set of one or more processors 1402 of that electronic device. One or more parts of various embodiments may be implemented using different combinations of software, firmware, and/or hardware.

A computing device 1400 can include some type of display element 1406, such as a touch screen or liquid crystal display (LCD), although many devices such as portable media players might convey information via other means, such as through audio speakers, and other types of devices such as server end stations may not have a display element 1406 at all. As discussed, some computing devices used in some embodiments include at least one input and/or output component(s) 1412 able to receive input from a user. This input component can include, for example, a push button, touch pad, touch screen, wheel, joystick, keyboard, mouse, keypad, or any other such device or element whereby a user is able to input a command to the device. In some embodiments, however, such a device might be controlled through a combination of visual and/or audio commands and utilize a microphone, camera, sensor, etc., such that a user can control the device without having to be in physical contact with the device.

Figure 15:
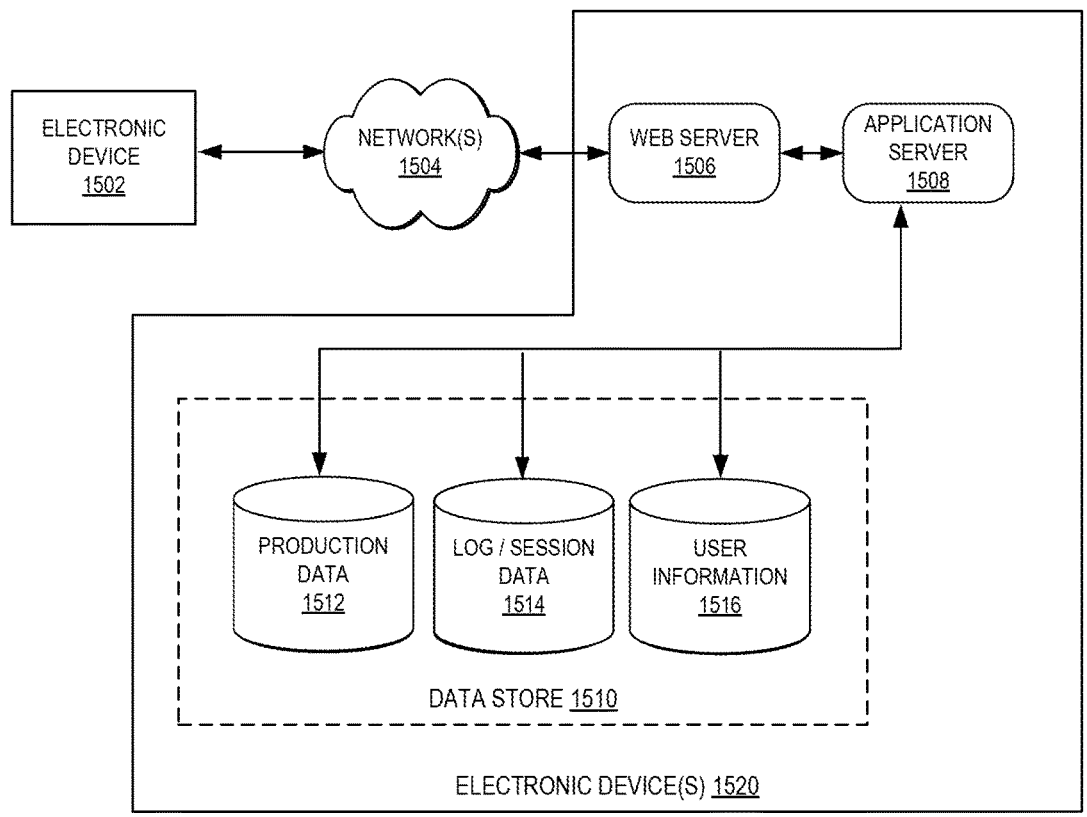
FIG. 15 illustrates an example of an environment for implementing aspects in accordance with various embodiments.

As discussed, different approaches can be implemented in various environments in accordance with the described embodiments. For example, FIG. 15 illustrates an example of an environment 1500 for implementing aspects in accordance with various embodiments. For example, in some embodiments communications are HyperText Transfer Protocol (HTTP) requests that are received by a web server (e.g., web server 1506), and the users, via electronic devices, may interact with the provider network via a web portal provided via the web server 1506 and application server 1508. As will be appreciated, although a web-based environment is used for purposes of explanation, different environments may be used, as appropriate, to implement various embodiments. The system includes an electronic client device 1502, which may also be referred to as a client device and can be any appropriate device operable to send and receive requests, messages or information over an appropriate network 1504 and convey information back to a user of the device 1502. Examples of such client devices include personal computers (PCs), cell phones, handheld messaging devices, laptop computers, set-top boxes, personal data assistants, electronic book readers, wearable electronic devices (e.g., glasses, wristbands, monitors), and the like. The one or more networks 1504 can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network 1504 includes the Internet, as the environment includes a web server 1506 for receiving requests and serving content in response thereto, although for other networks an alternative device serving a similar purpose could be used, as would be apparent to one of ordinary skill in the art.

The illustrative environment includes at least one application server 1508 and a data store 1510. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server 1508 can include any appropriate hardware and software for integrating with the data store 1510 as needed to execute aspects of one or more applications for the client device 1502 and handling a majority of the data access and business logic for an application. The application server 1508 provides access control services in cooperation with the data store 1510 and is able to generate content such as text, graphics, audio, video, etc., to be transferred to the client device 1502, which may be served to the user by the web server in the form of HyperText Markup Language (HTML), Extensible Markup Language (XML), JavaScript Object Notation (JSON), or another appropriate unstructured or structured language in this example. The handling of all requests and responses, as well as the delivery of content between the client device 1502 and the application server 1508, can be handled by the web server 1506. It should be understood that the web server 1506 and application server 1508 are not required and are merely example components, as structured code discussed herein can be executed on any appropriate device or host machine as discussed elsewhere herein.

The data store 1510 can include several separate data tables, databases, or other data storage mechanisms and media for storing data relating to a particular aspect. For example, the data store illustrated includes mechanisms for storing production data 1512 and user information 1516, which can be used to serve content for the production side. The data store 1510 also is shown to include a mechanism for storing log or session data 1514. It should be understood that there can be many other aspects that may need to be stored in the data store, such as page image information and access rights information, which can be stored in any of the above listed mechanisms as appropriate or in additional mechanisms in the data store 1510. The data store 1510 is operable, through logic associated therewith, to receive instructions from the application server 1508 and obtain, update, or otherwise process data in response thereto. In one example, a user might submit a search request for a certain type of item. In this case, the data store 1510 might access the user information 1516 to verify the identity of the user and can access a production data 1512 to obtain information about items of that type. The information can then be returned to the user, such as in a listing of results on a web page that the user is able to view via a browser on the user device 1502. Information for a particular item of interest can be viewed in a dedicated page or window of the browser.

The web server 1506, application server 1508, and/or data store 1510 may be implemented by one or more electronic devices 1520, which can also be referred to as electronic server devices or server end stations, and may or may not be located in different geographic locations. Each of the one or more electronic devices 1520 may include an operating system that provides executable program instructions for the general administration and operation of that device and typically will include computer-readable medium storing instructions that, when executed by a processor of the device, allow the device to perform its intended functions. Suitable implementations for the operating system and general functionality of the devices are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the environment 1500 in FIG. 15 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   initiating a communication link between a first and a second edge device for the first and seconds edge devices to transmit and receive at least compressed audio data;
   determining a bandwidth of the communication link, the determined bandwidth to be used to set an amount of compression of audio data to be performed by the first edge device;

transmitting a re-encoding machine learning model corresponding to a voice of a user of the first edge device to the second edge device, the second edge device to utilize the re-encoding machine learning model of the user of the first edge device to re-encoding at least the compressed audio data transmitted over the initiated communication link to approximate the voice of the user of the first edge device; and passing compressed audio data from the first edge device to the second edge device using the initiated communication link.

2. The computer-implemented method of claim 1, wherein the re-encoding machine learning model is a text to speech model comprising a plurality of layers.

3. The computer-implemented method of claim 1, wherein the compressed audio data is an output of an intermediate layer of a compression machine learning model.

4. A computer-implemented method comprising:
   initiating a communication link with an edge device to exchange audio data;
   receiving a compressed audio data from the edge device;
   re-encoding the received compressed audio data using a re-encoding machine learning model to approximate a voice; and
   outputting the approximated voice.

5. The computer-implemented method of claim 4, further comprising:
   determining a bandwidth of the communication link, the determined bandwidth to be used to set an amount of compression of audio data to be performed by the edge device.

6. The computer-implemented method of claim 4, further comprising:
   receiving raw input audio data;
   compressing the received raw input audio data into compressed raw audio data using a compression machine learning model using a text to speech machine learning model comprising a plurality of layers.

7. The computer-implemented method of claim 6, further comprising:
   training the compression machine learning model using the raw input audio data.

8. The computer-implemented method of claim 6, wherein the compression machine learning model is a recurrent neural network (RNN).

9. The computer-implemented method of claim 8, wherein at least one of the hidden layers of the RNN utilizes long short-term memory (LSTM).

10. The computer-implemented method of claim 8, wherein the compressed raw audio data is an output of intermediate layer of the RNN and includes audio data and metadata.

11. The computer-implemented method of claim 4, further comprising:
    sending audio data that has not been compressed using a compression machine learning model.

12. The computer-implemented method of claim 4, wherein the re-encoding machine learning model corresponds to a voice of a user of the edge device.

13. The computer-implemented method of claim 4, further comprising:
    receiving the re-encoding machine learning model from the edge device.

14. The computer-implemented method of claim 4, further comprising:
    receiving the re-encoding machine learning model from an intermediate device.

15. The computer-implemented method of claim 4, wherein the compressed audio data is text.

16. The computer-implemented method of claim 4, wherein the compressed audio data is an output of an intermediate layer of a recurrent neural network (RNN) of the edge device and includes audio data and metadata.

17. A system comprising:
    a web services provider server to initiation communications between a first and a second edge device; and
    the first edge device including hardware execution resources to execute instructions stored in memory, the instructions upon execution to cause:
       a receipt of a compressed audio data from the second edge device,
       a re-encode of the received compressed audio data using a re-encoding machine learning model to approximate a voice; and
       a generation of the approximated voice.

18. The system of claim 17, wherein the web services provider is further to determine a bandwidth of the communication link, the determined bandwidth to be used to set an amount of compression of audio data to be performed by the second edge device.

19. The system of claim 17, wherein the instructions are further to cause:
    a receipt of raw input audio data; and
    a compression of the received raw input audio data into compressed raw audio data using a compression machine learning model using a text to speech machine learning model comprising a plurality of layers.

20. The system of claim 19, wherein the compressed raw audio data is an output of an intermediate layer of a recurrent neural network (RNN).

* * * * *